United States Patent
Pedder et al.

(10) Patent No.: US 12,455,451 B2
(45) Date of Patent: Oct. 28, 2025

(54) TUNABLE LENS IN AN ELECTRONIC DEVICE CONTROLLED USING A PAIRED ELECTRONIC DEVICE

(71) Applicant: Apple Inc., Cupertino, CA (US)

(72) Inventors: James E Pedder, Oxon (GB); Igor Stamenov, San Ramon, CA (US); Matthew D Hollands, Cambridge (GB); Thomas M Gregory, Cambridge (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/407,267

(22) Filed: Jan. 8, 2024

(65) Prior Publication Data
US 2024/0280817 A1    Aug. 22, 2024

Related U.S. Application Data

(60) Provisional application No. 63/485,810, filed on Feb. 17, 2023.

(51) Int. Cl.
*G02B 27/01* (2006.01)
*G06F 3/01* (2006.01)
*H04W 4/80* (2018.01)

(52) U.S. Cl.
CPC ......... *G02B 27/0172* (2013.01); *G06F 3/013* (2013.01); *G06F 3/017* (2013.01); *H04W 4/80* (2018.02)

(58) Field of Classification Search
CPC ..... G06F 3/013; G06F 3/017; G02B 27/0172; H04W 4/80
See application file for complete search history.

(56) References Cited

U.S. PATENT DOCUMENTS

| | | | |
|---|---|---|---|
| 5,359,444 A | * | 10/1994 | Piosenka ........... G02B 7/32 349/13 |
| 9,057,826 B2 | | 6/2015 | Gupta et al. |
| 9,304,319 B2 | | 4/2016 | Bar-Zeev et al. |
| 9,681,804 B2 | | 6/2017 | Spitzer |
| 10,241,569 B2 | | 3/2019 | Lanman et al. |
| 10,775,628 B2 | | 9/2020 | Samec et al. |

(Continued)

FOREIGN PATENT DOCUMENTS

| | | |
|---|---|---|
| KR | 20150001425 A | 1/2015 |
| WO | 2022102957 A1 | 5/2022 |

*Primary Examiner* — Mihir K Rayan
(74) *Attorney, Agent, or Firm* — Treyz Law Group, P.C.; Joseph F. Guihan; Jinie M. Guihan

(57) ABSTRACT

A head-mounted device may include a lens module with a least one adjustable lens. The head-mounted device may be wirelessly paired to an electronic device such as a cellular telephone, watch, laptop computer, etc. To correct for presbyopia, the optical power of adjustable lenses in a head-mounted device may be adjusted when the user is viewing a close object. To allow for intelligent adjustments of the adjustable lenses while minimizing power consumption in the head-mounted device, the head-mounted device may receive sensor data and/or focal point change instructions from a paired electronic device. The paired electronic device may detect a trigger, analyze the user's attention to the paired electronic device, and send focal point change instructions to the head-mounted device based on the obtained information.

19 Claims, 6 Drawing Sheets

RECEIVE, FROM A PAIRED ELECTRONIC DEVICE, POSITION AND/OR ORIENTATION INFORMATION FOR THE PAIRED ELECTRONIC DEVICE, USER ATTENTION INFORMATION FOR THE PAIRED ELECTRONIC DEVICE, THE DISTANCE FROM THE PAIRED ELECTRONIC DEVICE TO THE ELECTRONIC DEVICE, AND/OR OTHER INFORMATION ⎯202

BASED ON THE RECEIVED INFORMATION FROM THE PAIRED ELECTRONIC DEVICE, ADJUST A TUNABLE LENS ON THE ELECTRONIC DEVICE ⎯204

(56) References Cited

U.S. PATENT DOCUMENTS

| | | |
|---|---|---|
| 10,881,287 B1 | 1/2021 | Ouderkirk et al. |
| 11,556,012 B2* | 1/2023 | Grutman ................ G06F 3/013 |
| 11,606,456 B1* | 3/2023 | Kumar Agrawal ... G06F 1/1694 |
| 12,141,998 B2* | 11/2024 | Agrawal .................. G06T 7/11 |
| 2012/0218303 A1* | 8/2012 | Nakada ............... G06F 3/0482 |
| | | 345/649 |
| 2012/0249741 A1* | 10/2012 | Maciocci ............. G06T 19/006 |
| | | 348/51 |
| 2016/0037573 A1 | 2/2016 | Ko et al. |
| 2016/0140887 A1 | 5/2016 | Kim |
| 2016/0161767 A1* | 6/2016 | Childers ............... G02C 7/024 |
| | | 351/159.39 |
| 2016/0209648 A1 | 7/2016 | Haddick et al. |
| 2016/0364904 A1* | 12/2016 | Parker ................... G06F 3/038 |
| 2016/0378204 A1 | 12/2016 | Chen et al. |
| 2017/0003519 A1* | 1/2017 | Burkert .................. G02C 7/06 |
| 2019/0116088 A1 | 4/2019 | Mueglitz et al. |
| 2021/0011560 A1* | 1/2021 | Park ....................... G06F 3/017 |

* cited by examiner

TUNABLE LENS IN AN ELECTRONIC DEVICE CONTROLLED USING A PAIRED ELECTRONIC DEVICE

This application claims priority to U.S. provisional patent application No. 63/485,810 filed Feb. 17, 2023, which is hereby incorporated by reference herein in its entirety.

BACKGROUND

This relates generally to electronic devices and, more particularly, to wearable electronic device systems.

Electronic devices are sometimes configured to be worn by users. For example, head-mounted devices are provided with head-mounted structures that allow the devices to be worn on users' heads. The head-mounted devices may include optical systems with lenses.

Head-mounted devices typically include lenses with fixed shapes and properties. If care is not taken, it may be difficult to adjust these types of lenses to optimally present content to each user of the head-mounted device.

SUMMARY

An electronic device may include a head-mounted support structure, an adjustable lens that is coupled to the head-mounted support structure, and wireless communication circuitry configured to wirelessly receive information from a paired electronic device. The adjustable lens may be adjusted in response to the information received from the paired electronic device.

An electronic device may include at least one sensor that is configured to obtain user attention information in response to a trigger and wireless communication circuitry configured to communicate with a head-mounted device having an adjustable lens. The wireless communication circuitry may be configured to, based at least on the user attention information, transmit information to the head-mounted device that causes an adjustment to the adjustable lens in the head-mounted device.

An electronic device may include an accelerometer that is configured to obtain first orientation information and wireless communication circuitry configured to communicate with a head-mounted device having an adjustable lens. The wireless communication circuitry may be configured to receive second orientation information from the head-mounted device and, after a trigger event and based at least on the first orientation information and the second orientation information, transmit information to the head-mounted device that causes an adjustment to the adjustable lens in the head-mounted device.

DETAILED DESCRIPTION

Figure 1:
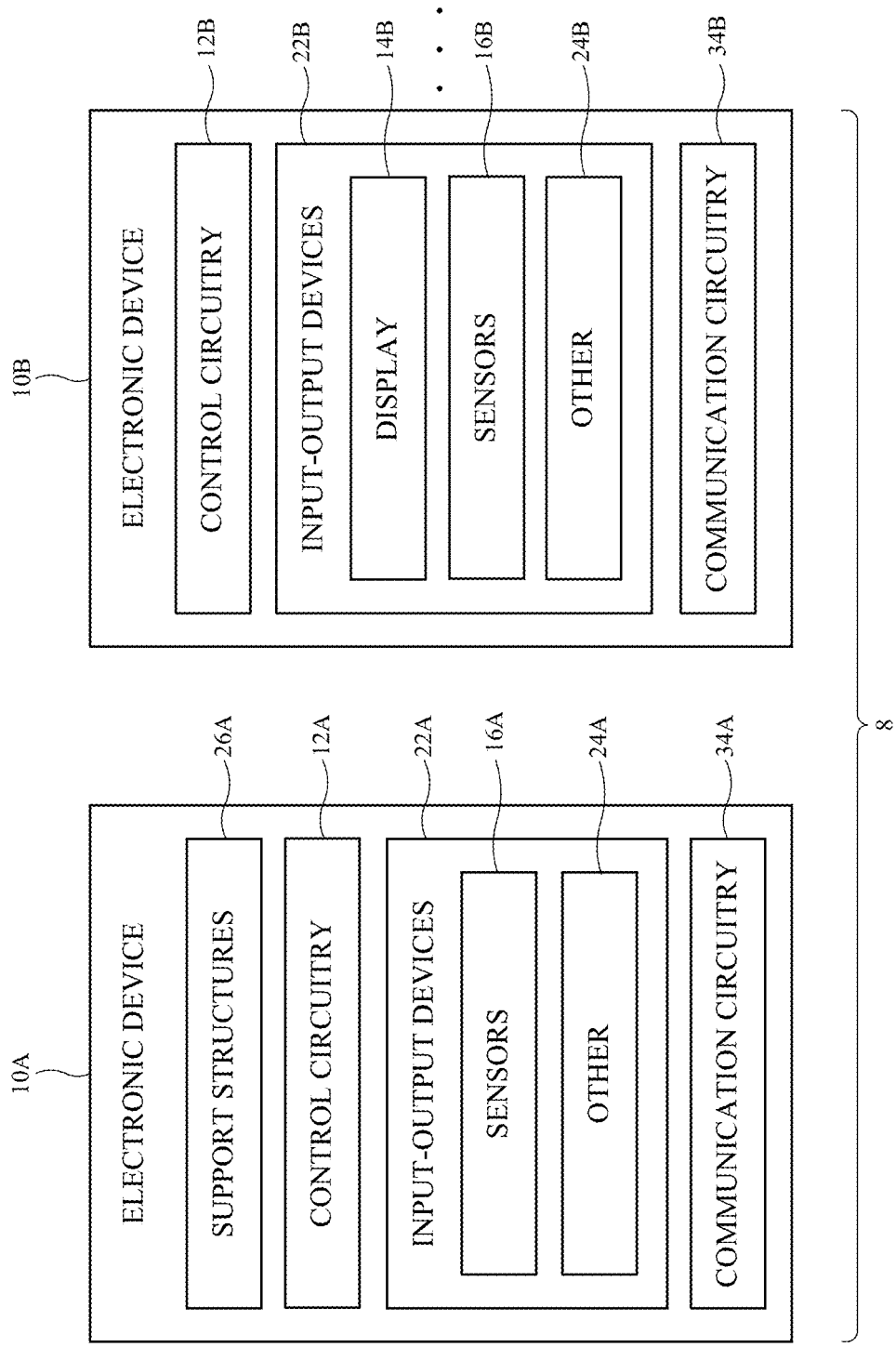
FIG. 1 is a schematic diagram of an illustrative system with multiple electronic devices such as a head-mounted device and a paired electronic device in accordance with various embodiments.

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain a tunable lens system. The lens system may be used to allow the user to focus on display content from the head-mounted device and/or a physical environment that is viewable through the tunable lens system. The lens system may have a left lens module that is aligned with a user's left eye and a right lens module that is aligned with a user's right eye.

The lens modules in the head-mounted device may include lenses that are adjustable. The adjustable lenses may be fluid-filled adjustable lenses or other types of adjustable lenses. The adjustable lenses may be adjusted for specific viewers (e.g., to account for a prescription) or may be adjusted depending on the viewing scenario for the user. As an example, adjustable lenses in a head-mounted device may be configured to correct for presbyopia. Presbyopia makes it difficult for the eye to focus on close objects. To correct for presbyopia, the adjustable lenses in a head-mounted device may adjust a provided optical power when the user is viewing a close object. For example, the adjustable lenses may provide an optical power of 0 diopter when the user is looking at a faraway object and may be adjusted to provide an optical power of +2 diopter (D) when the user is looking at a close object. In other words, the adjustable lenses may be adjusted to provide an optimal amount of optical power for a given situation for the user.

If care is not taken, determining when to increase optical power to allow a user to look at a close object may consume more power than is desired. For example, one or more sensors on the head-mounted device may detect when the user is viewing a close object or a faraway object. However, operating these sensors may consume more power than desired. To allow for intelligent adjustments of the adjustable lenses while minimizing power consumption in the head-mounted device, the head-mounted device may receive sensor data and/or focal point change instructions from a paired electronic device.

The head-mounted device may be wirelessly paired to a paired electronic device such as a cellular telephone, watch, laptop computer, etc. The paired electronic device may detect a trigger, analyze the user's attention to the paired electronic device, and send focal point change instructions to the head-mounted device based on the obtained information. As a specific example, consider a user with a head-mounted device and a cellular telephone that is paired with the head-mounted device. The user may pick up and unlock their cellular telephone. The cellular telephone may detect this action as a trigger event, verify that the user is paying attention to the cellular telephone (e.g., using sensors in the cellular telephone), and determine with sufficient confidence that the user is holding the cellular telephone close to the head-mounted device to view the cellular telephone. The cellular telephone sends this information to the head-mounted device. The head-mounted device receives the information from the cellular telephone and adjusts the adjustable lenses to have an optical power associated with viewing close objects.

A schematic diagram of an illustrative system having an electronic device with an adjustable lens is shown in FIG. 1. As shown in FIG. 1, system 8 may include one or more electronic devices such as electronic device 10A and electronic device 10B. The electronic devices of system 8 may include computers such as laptop computers, cellular telephones, head-mounted devices, wristwatch devices, earbuds, and other electronic devices. Configurations in which electronic device 10A is a head-mounted device are sometimes described herein as an example.

As shown in FIG. 1, an electronic device such as electronic device 10A may have control circuitry 12A. Control circuitry 12A may include storage and processing circuitry for controlling the operation of device 10A. Circuitry 12A may include storage such as hard disk drive storage, non-volatile memory (e.g., electrically-programmable-read-only memory configured to form a solid-state drive), volatile memory (e.g., static or dynamic random-access-memory), etc. Processing circuitry in control circuitry 12A may be based on one or more microprocessors, microcontrollers, digital signal processors, baseband processors, power management units, audio chips, graphics processing units, application specific integrated circuits, and other integrated circuits. Software code may be stored on storage in circuitry 12A and run on processing circuitry in circuitry 12A to implement control operations for device 10A (e.g., data gathering operations, operations involved in processing three-dimensional facial image data, operations involving the adjustment of components using control signals, etc.).

Device 10A may include input-output devices 22A. Input-output devices 22A may be used to allow a user to provide device 10A with user input. Input-output devices 22A may also be used to gather information on the environment in which device 10A is operating. Output components in devices 22A may allow device 10A to provide a user with output and may be used to communicate with external electrical equipment.

Input-output circuitry 22A may include sensors 16A. Sensors 16A may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), fingerprint sensors and other biometric sensors, optical position sensors (optical encoders), and/or other position sensors such as linear position sensors, and/or other sensors. Sensors 16A may include proximity sensors (e.g., capacitive proximity sensors, light-based (optical) proximity sensors, ultrasonic proximity sensors, and/or other proximity sensors).

User input and other information may be gathered using sensors and other input devices in input-output devices 22A. If desired, input-output devices 22A may include other devices 24A such as haptic output devices (e.g., vibrating components), light-emitting diodes and other light sources, speakers such as ear speakers for producing audio output, and other electrical components. Device 10A may include circuits for receiving wireless power, circuits for transmitting power wirelessly to other devices, batteries and other energy storage devices (e.g., capacitors), joysticks, buttons, and/or other components.

Input-output devices 22A may optionally include one or more displays. In some configurations, device 10A includes left and right display panels (sometimes referred to as left and right portions of a display and/or left and right displays) that are in alignment with the user's left and right eyes, respectively. In other configurations, the display may include a single display panel that extends across both eyes. Device 10A may include an optical pass-through area where real-world content is viewable to the user either directly or through a tunable lens. Displays in device 10A may be organic light-emitting diode displays or other displays based on arrays of light-emitting diodes, liquid crystal displays, liquid-crystal-on-silicon displays, projectors or displays based on projecting light beams on a surface directly or indirectly through specialized optics (e.g., digital micromirror devices), electrophoretic displays, plasma displays, electrowetting displays, or any other desired displays.

Electronic device 10A may have housing structures (e.g., housing walls, straps, etc.), as shown by illustrative support structures 26A of FIG. 1. In configurations in which electronic device 10A is a head-mounted device (e.g., a pair of glasses, goggles, a helmet, a hat, etc.), support structures 26A may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10A and may support sensors 16A, other components 24A, other input-output devices 22A, and control circuitry 12A.

Head-mounted device 10A may also include communication circuitry 34A to allow the head-mounted device to communicate with external equipment (e.g., a tethered computer, a portable device such as a handheld device, watch, or laptop computer, or other electrical equipment). Communication circuitry 34A may be used for both wired and wireless communication with external equipment.

Communication circuitry 34A may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

The radio-frequency transceiver circuitry in wireless communications circuitry 34A may handle wireless local area network (WLAN) communications bands such as the 2.4 GHZ and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHZ), a cellular low-midband (LMB) (e.g., 1400 to 1550 MHZ), a cellular midband (MB) (e.g., from 1700 to 2200 MHZ), a cellular high band (HB) (e.g., from 2300 to 2700 MHZ), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHZ, etc.), a near-field communications (NFC) band (e.g., at 13.56 MHZ), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHZ), and/or any other desired communications bands.

The radio-frequency transceiver circuitry may include millimeter/centimeter wave transceiver circuitry that supports communications at frequencies between about 10 GHz and 300 GHz. For example, the millimeter/centimeter wave transceiver circuitry may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, the millimeter/centimeter wave transceiver circuitry may support communications in an IEEE K communications band between about 18 GHz and 27 GHz, a $K_a$ communications band between about 26.5 GHZ and 40 GHZ, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, the millimeter/centimeter wave transceiver circuitry may support IEEE 802.11ad communications at 60 GHz (e.g., WiGig or 60 GHz Wi-Fi bands around 57-61 GHZ), and/or $5^{th}$ generation mobile networks or $5^{th}$ generation wireless systems (5G) New Radio (NR) Frequency Range 2 (FR2) communications bands between about 24 GHz and 90 GHz.

Antennas in wireless communications circuitry 34A may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link and another type of antenna may be used in forming a remote wireless link antenna.

Electronic device 10B may be paired with electronic device 10A. In other words, a wireless link may be established between electronic devices 10A and 10B to allow fast and efficient communication between devices 10A and 10B. Electronic devices 10A and 10B may be associated with the same user (e.g., signed into a cloud service using the same user ID), may exchange wireless communications, etc. As previously described, electronic device 10A may be a head-mounted device whereas electronic device 10B is a paired electronic device such as a cellular telephone, watch, laptop computer, earbuds, etc. Electronic device 10B may include control circuitry 12B, input-output devices 22B, sensors 16B, other components 24B, communication circuitry 34B, and display 14B. Control circuitry 12B, input-output devices 22B, sensors 16B, other components 24B, and communication circuitry 34B may have the same features and capabilities as the corresponding components in electronic device 10A and, for simplicity, the descriptions thereof will not be repeated. Display 14B may be an organic light-emitting diode display or other displays based on arrays of light-emitting diodes, a liquid crystal display, a liquid-crystal-on-silicon display, a projector or display based on projecting light beams on a surface directly or indirectly through specialized optics (e.g., digital micromirror devices), an electrophoretic display, a plasma display, an electrowetting display, or any other desired display.

In the event that electronic device 10B is a cellular telephone, electronic device 10B may have a housing and display 14B may form a front face of the electronic device within the housing. In the event that electronic device 10B is a watch, electronic device 10B may have a housing, display 14B may form a front face of the electronic device within the housing, and a wristwatch strap may extend from first and second opposing sides of the housing. In the event that electronic device 10B is a laptop computer, electronic device 10B may have a lower housing with a keyboard and/or touchpad and an upper housing with a display. The lower housing and the upper housing may be coupled at a hinge such that the upper housing rotates relative to the lower housing to open and close the laptop computer.

Figure 2:
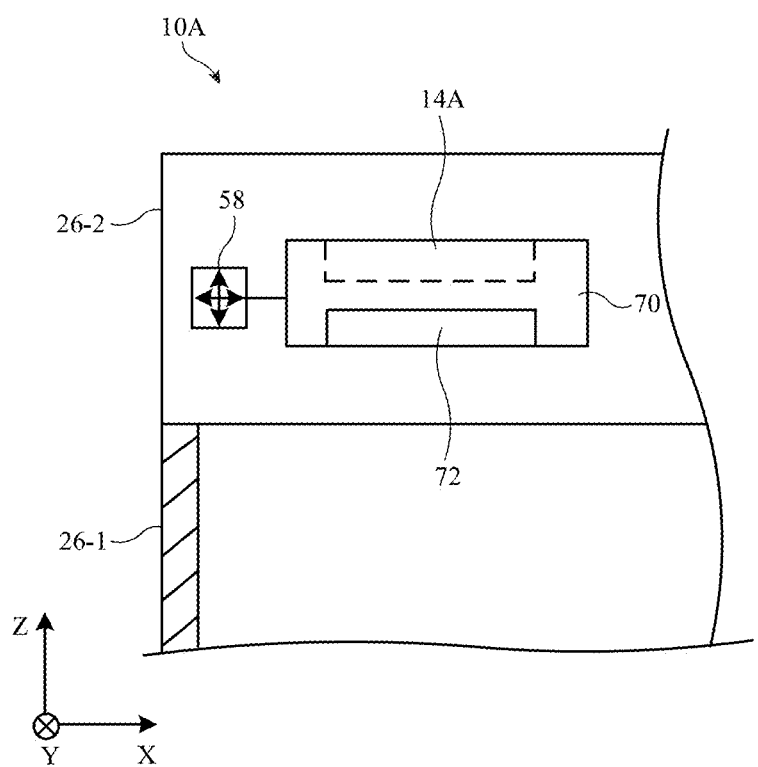
FIG. 2 is a top view of an illustrative head-mounted device in accordance with various embodiments.

FIG. 2 is a top view of electronic device 10A in an illustrative configuration in which electronic device 10A is a head-mounted device. As shown in FIG. 2, electronic device 10A may include support structures (sec, e.g., support structures 26A of FIG. 1) that are used in housing the components of device 10A and mounting device 10A onto a user's head. These support structures may include, for example, structures that form housing walls and other structures for main unit 26-2 (e.g., exterior housing walls, lens module structures, etc.) and eyeglass temples or other supplemental support structures such as structures 26-1 that help to hold main unit 26-2 on a user's face.

The electronic device may include optical modules such as optical module 70. The electronic device may include left and right optical modules that correspond respectively to a user's left eye and right eye. An optical module corresponding the user's left eye is shown in FIG. 2.

Each optical module 70 includes a corresponding lens module 72 (sometimes referred to as lens stack-up 72, lens 72, or adjustable lens 72). Lens 72 may include one or more lens elements arranged along a common axis. Each lens element may have any desired shape and may be formed from any desired material (e.g., with any desired refractive index). The lens elements may have unique shapes and refractive indices that, in combination, focus light (e.g., from a display or from the physical environment) in a desired manner. Each lens element of lens module 72 may be formed from any desired material (e.g., glass, a polymer material such as polycarbonate or acrylic, a crystal such as sapphire, etc.).

Modules 70 may optionally be individually positioned relative to the user's eyes and relative to some of the housing wall structures of main unit 26-2 using positioning circuitry such as positioner 58. Positioner 58 may include stepper motors, piezoelectric actuators, motors, linear electromagnetic actuators, and/or other electronic components for adjusting the position of displays, the optical modules 70, and/or lens modules 72. Positioners 58 may be controlled by control circuitry 12A during operation of device 10A. For example, positioners 58 may be used to adjust the spacing between modules 70 (and therefore the lens-to-lens spacing between the left and right lenses of modules 70) to match the interpupillary distance IPD of a user's eyes. In another example, the lens module may include an adjustable lens element. The curvature of the adjustable lens element may be adjusted in real time by positioner(s) 58 to compensate for a user's eyesight, as one example.

Each optical module may optionally include a display such as display 14A in FIG. 2. As previously mentioned, the displays may be omitted from device 10A if desired. In this type of arrangement, the device may still include one or more lens modules 72 (e.g., through which the user views the real world). In this type of arrangement, real-world content may be selectively focused for a user.

Figure 3:
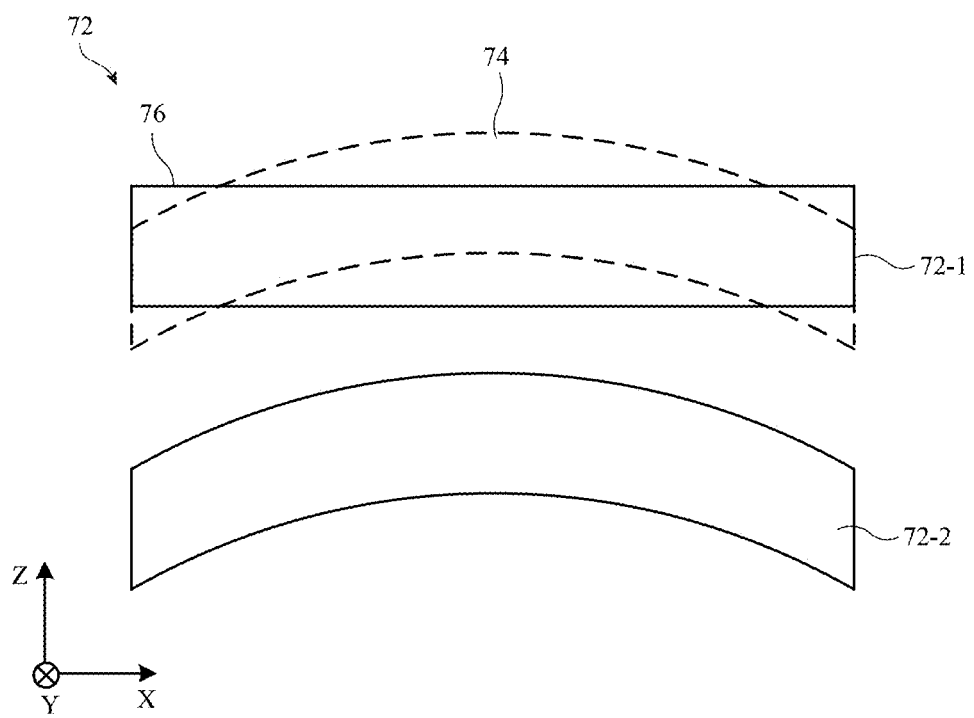
FIG. 3 is a cross-sectional side view of an illustrative lens module with first and second lens elements in accordance with various embodiments.

FIG. 3 is a cross-sectional side view of an illustrative lens module with multiple lens elements. As shown, lens module 72 includes a first lens element 72-1 and a second lens element 72-2. Each surface of the lens elements may have any desired curvature. One or both of lens elements 72-1 and 72-2 may be adjustable. In one example, lens element 72-2 is a fixed (e.g., non-adjustable) lens element whereas lens element 72-1 is an adjustable lens element. The adjustable lens element 72-1 may be used to accommodate a user's eyeglass prescription, for example. The shape of lens element 72-1 may be adjusted if a user's eyeglass prescription changes (without needing to replace any of the other components within device 10A). As another possible use case, a first user with a first eyeglass prescription (or no eyeglass prescription) may use device 10A with lens element 72-1 having a first shape and a second, different user with a second eyeglass prescription may use device 10A with lens element 72-1 having a second shape that is different than the first shape. Lens element 72-1 may have varying lens power and/or may provide varying amount of astigmatism correction to provide prescription correction for the user.

As another example, to correct for presbyopia, lens element 72-1 may have a first shape (e.g., the shape shown by the dashed line 74) when the user is viewing a close object and a second, different shape (e.g., the shape shown by the solid line 76) when the user is viewing a faraway object. The first shape 74 may have one or more surfaces with more curvature (e.g., a lower radius of curvature) than the corresponding surfaces in the second shape 76. In other words, the lens element 72-1 may be adjusted to have more curvature (and, correspondingly, a greater optical power) when the user is viewing a close object than when the user is viewing a faraway object.

Lens element 72-1 may optionally have a multifocal shape where the optical power changes continuously across the aperture. In this type of configuration, the radius of curvature continuously changes across the lens element. With this type of shape, light from both close and faraway objects will be properly focused for the user. However, there may be performance limitations as the user looks away from the center of the lens element. Accordingly, the lens element 72-1 may be adjusted to have the multifocal shape when the user is viewing a close object and a second, different shape (e.g., shown by solid line 76) when the user is viewing a faraway object.

The example of lens module 72 including two lens elements is merely illustrative. In general, lens module 72 may include any desired number of lens elements (e.g., one, two, three, four, more than four, etc.). Any subset or all of the lens elements may optionally be adjustable. Any of the adjustable lens elements in the lens module may optionally be fluid-filled adjustable lenses. Lens module 72 may also include any desired additional optical layers (e.g., partially reflective mirrors that reflect 50% of incident light, linear polarizers, retarders such as quarter wave plates, reflective polarizers, circular polarizers, reflective circular polarizers, etc.) to manipulate light that passes through lens module.

Figure 4:
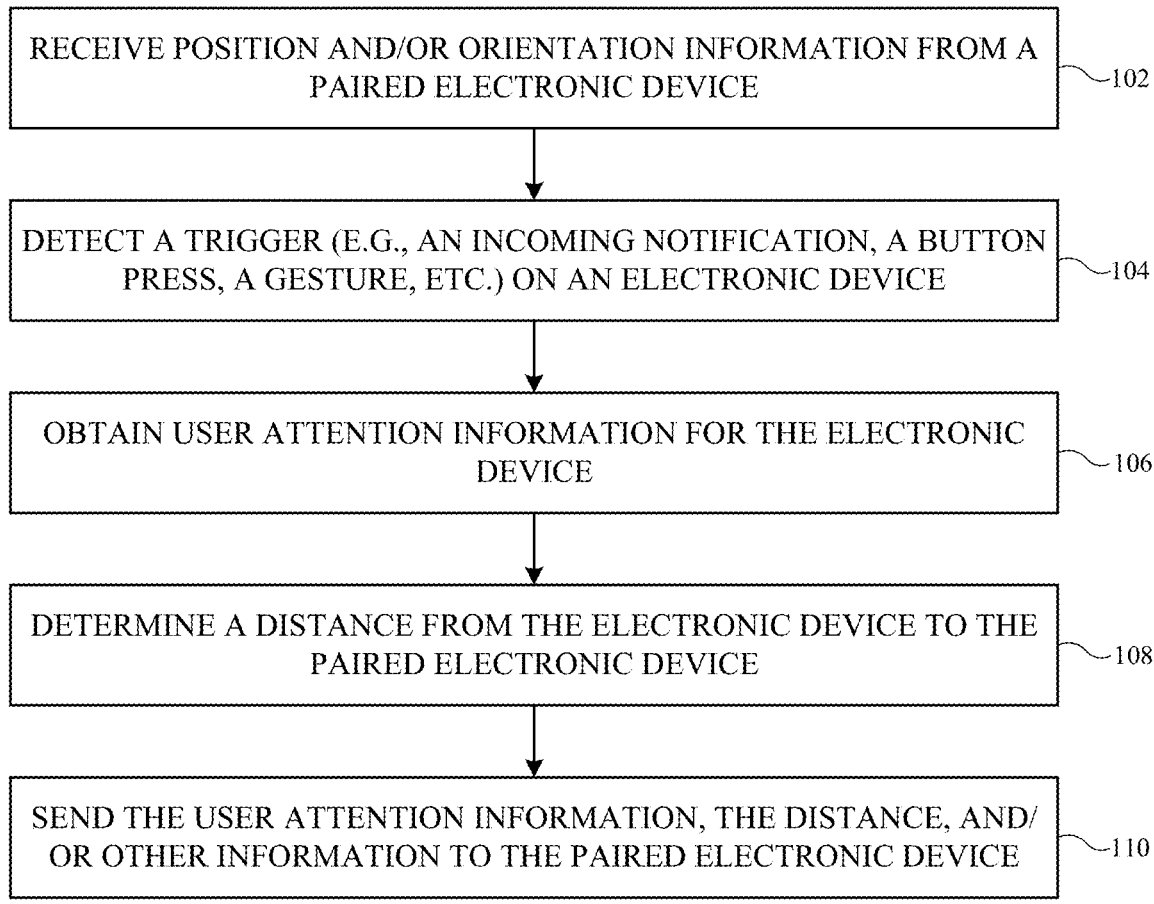
FIG. 4 is a flowchart of illustrative method steps for operating an illustrative electronic device that is paired with a head-mounted device having an adjustable lens in accordance with various embodiments.

FIG. 4 is a flowchart of illustrative method steps for operating an electronic device that is paired with an additional electronic device that has an adjustable lens (such as a head-mounted device). For example, FIG. 4 shows method steps for operating electronic device 10B (which is paired with a head-mounted device 10A having an adjustable lens).

At step 102 in FIG. 4, electronic device 10B may receive position and/or orientation information from the paired head-mounted device 10A. Head-mounted device 10A may use one or more sensors that are configured to gather information on motion, position, and/or orientation of the head-mounted device (e.g., accelerometers, gyroscopes, compasses, and/or inertial measurement units that include all of these sensors or a subset of one or two of these sensors). Head-mounted device 10A may wirelessly transmit the gathered motion, position, and/or orientation information to electronic device 10B (using communication circuitry 34A). Head-mounted device 10B may wirelessly receive the information using communication circuitry 34B.

At step 104, electronic device 10B may detect a trigger. A trigger may indicate that an electronic device is actively being used (and paid attention to) or that an electronic device is no longer being used (and no longer being paid attention to).

Some devices such as cellular telephones, watches, and laptop computers are typically used by a user at a relatively close viewing distance. For these devices, triggers at step 104 associated with the device being used may indicate a high likelihood of electronic device 10B being viewed by the user of head-mounted device 10A at a close distance. Other devices such as televisions (or devices associated with televisions), smart speakers, or other electronic devices are typically used by a user at a relatively far viewing distance. For these devices, triggers at step 104 associated with the device being used may indicate a high likelihood of electronic device 10B being viewed by the user of head-mounted device 10A at a far distance.

One example of a trigger is an incoming notification on device 10B. When the notification is presented using device 10B (e.g., using display 14B on device 10B), there is a high likelihood of the user of the head-mounted device 10A viewing the notification. For electronic devices typically viewed at close range, the incoming notification may therefore be associated with a high likelihood of a close object being viewed by the head-mounted device.

In addition to an incoming notification, the trigger may be associated with a button press on electronic device 10B. If a user presses a button on electronic device 10B, there is a high likelihood that they are viewing the electronic device 10B at a close viewing distance.

The trigger may be detected by one or more sensors in electronic device 10B. For example, the trigger may be a gesture that is detected using one or more position and/or motion sensors on electronic device 10B. For example, an accelerometer in electronic device 10B may identify a raise-to-wake gesture indicating that a user has just picked up electronic device 10B. The identification of the gesture may be associated with a high likelihood that the user is viewing the electronic device 10B at a close viewing distance.

Consider an example where electronic device 10B is a cellular telephone. The cellular telephone may have one or more buttons. The display of the cellular telephone may be activated when one of the buttons is pressed. The pressing of a button on the cellular telephone may also serve as a trigger in step 104. The cellular telephone may also receive a notification (e.g., associated with an incoming text message, an incoming email, an incoming phone call, etc.). The cellular telephone may present information regarding the notification (e.g., by presenting visual information on display 14B, playing audio over the speaker of the cellular telephone, etc.). The incoming notification may also serve as a trigger in step 104. The cellular telephone may include an accelerometer that detects gestures such as a raise-to-wake gesture. The raise-to-wake gesture detected by the accelerometer may cause the display in the cellular telephone to be activated. The detected gesture may also serve as a trigger in step 104. In general, any sensor input or other activity detected by the cellular telephone may serve as a trigger in step 104.

Consider an example where electronic device 10B is a watch. The watch may have one or more buttons (and/or a digital crown). The display of the watch may be activated when one of the buttons (and/or the digital crown) is pressed/rotated. The pressing of a button (and/or the rotation of the digital crown) on the watch may also serve as a trigger in step 104. The watch may also receive a notification (e.g., associated with an incoming text message, an incoming email, an incoming phone call, etc.). The watch may present information regarding the notification (e.g., by presenting visual information on display 14B, playing audio over the speaker of the watch, etc.). The incoming notification may also serve as a trigger in step 104. The watch may include an accelerometer that detects gestures such as the user's wrist being raised (e.g., to look at the watch). The detected gesture may cause the display in the watch to be activated. The detected gesture may also serve as a trigger in step 104. In general, any sensor input or other activity detected by the watch may serve as a trigger in step 104.

Consider an example where electronic device 10B is a laptop computer. The laptop computer may have a keyboard, a touchpad (e.g., that is used to control a mouse), and one or more buttons. The display of the laptop computer may be activated when one of the buttons, the keyboard, and/or the touchpad is pressed or touched (e.g., to awake the laptop computer if the laptop computer is in a sleep or standby mode). The pressing or touching of one of the buttons, the keyboard, or the touchpad on the laptop computer may also serve as a trigger in step 104. The laptop computer may also receive a notification (e.g., associated with an incoming text message, an incoming email, an incoming phone call, etc.). The laptop computer may present information regarding the notification (e.g., by presenting visual information on display 14B, playing audio over the speaker of the laptop computer, etc.). The incoming notification may also serve as a trigger in step 104. The laptop computer may include one or more sensors that detects when the laptop computer is opened. Detecting the laptop computer being opened may serve as a trigger in step 104. In general, any sensor input or other activity detected by the laptop computer may serve as a trigger in step 104.

Next, at step 106, electronic device 10B may obtain user attention information for the electronic device. The trigger from step 104 may serve as an indicator that a user is likely viewing electronic device 10B. The attention information gathered at step 106 may be used to confirm (or increase the confidence level) that a user is actively viewing electronic device 10B. Sensors that are powered down or in a standby mode before step 106 may be powered on and/or activated at step 106 to obtain data regarding user attention. The sampling frequency of one or more sensors may be increased at step 106 to obtain data regarding user attention. Instead or in addition, data from sensors that are already running before step 106 may be used to determine user attention.

The user attention information gathered at step 106 may include any desired sensor information. As one example, the electronic device may include one or more sensors in a facial recognition module (e.g., that is used to unlock the electronic device). The facial recognition module may include various components such as an infrared camera, a dot projector, a proximity sensor, an ambient light sensor, etc. The facial recognition module may detect the presence of a face in front of the electronic device 10B and verify that the viewer of the electronic device 10B is an authorized user for electronic device 10B. At step 106, the facial recognition module may identify the authorized use for electronic device (indicating the user is paying attention to the electronic device 10B).

Also at step 106, one or more sensors in the electronic device may be used to determine if the user of the electronic device 10B is gazing at the electronic device (e.g., using a gaze detection sensor). The facial recognition module may be capable of identifying whether or not the viewer is gazing at the electronic device.

As another example, the user attention information from step 106 may include information regarding the orientation of electronic device 10B. For example, the user may be most likely to be paying attention to electronic device 10B when the electronic device 10B is in a given orientation or within a range of orientations. The orientation of electronic device 10B may also be compared to the orientation of head-mounted device 10A at step 106 to determine if the user is paying attention to device 10B. For example, if the orientation information for head-mounted device 10A indicates that the user is tilting their head downwards and the orientation information for electronic device 10B indicates that device 10B is tilted upwards, the user may likely be paying attention to electronic device 10B. However, if the orientation information for head-mounted device 10A indicates that the user is tilting their head upwards and the orientation information for electronic device 10B indicates that device 10B is tilted downwards, the user may likely not be paying attention to electronic device 10B.

As another example, a front-facing (e.g., visible light) camera in electronic device 10B may be used to determine if a user is paying attention to the electronic device 10B. The front-facing camera may help identify if a user is in front of the electronic device 10B and whether or not the user is gazing at the electronic device 10B.

At step 108, electronic device 10B may determine a distance to the paired head-mounted device 10A. The distance may be determined using one or more light detection and ranging (LIDAR) sensors within electronic device 10B (e.g., a LIDAR sensor that is included in the facial recognition module, a LIDAR sensor separate from the facial recognition module, etc.). Alternatively or in addition, the distance may be determined using ultra-wideband (UWB) communications.

Finally, at step 110, electronic device 10B may send the user attention information (from step 106), the distance information (from step 108), and/or other information to the paired electronic device. The information sent at step 110 may cause head-mounted device 10A to adjust a tunable lens in head-mounted device 10A.

In one illustrative arrangement, electronic device 10B may use the information from steps 104, 106, and/or 108 to determine the adjustable lens in head-mounted device 10A should be adjusted. In this case, electronic device 10B may send instructions to head-mounted device 10A for the head-mounted device 10A to adjust the adjustable lens. In this case, electronic device 10B may forego sending any raw data or additional information to head-mounted device 10A.

In another possible arrangement, electronic device 10B may send raw data and other determinations to head-mounted device 10A. Head-mounted device 10A may receive the information and determine whether or not to update the adjustable lens accordingly.

The information sent at step 110 may be sent wirelessly using communication circuitry 34B (e.g., using Bluetooth communications or communications at another desired frequency).

Consider a scenario in which a user operates a cellular telephone. At step 102, the cellular telephone may receive information from a paired head-mounted device regarding the position and/or orientation of that head-mounted device. At step 104, the cellular telephone may detect that the user has pressed the power button to turn on the display of the cellular telephone. At step 106, the cellular telephone may activate one or more sensors that determine user attention information for the electronic device. For example, the cellular telephone may activate a facial recognition module that identifies a user's face and whether or not the user is paying attention to the cellular telephone. Instead or in addition, position and/or orientation information of the cellular telephone may be used to determine the user attention (e.g., by comparing the orientation of the cellular telephone to the orientation of the head-mounted device, by comparing the orientation of the cellular telephone to known orientations, etc.). At step 108, the cellular telephone may use ultra-wideband communication to determine a distance between the cellular telephone and the head-mounted device. At step 110, the cellular telephone may wirelessly transmit information regarding the trigger from step 104, the user attention information from step 106, and the distance from step 108 to the head-mounted device. Alternatively, the cellular telephone may use the information from steps 104-108 to determine that a focal point change is required on head-mounted device 10A and wirelessly transmit a focal point change instruction to the head-mounted device at step 110.

One or more steps of FIG. 4 may be omitted if desired. For example, consider a scenario in which a user operates a cellular telephone. At step 104, the cellular telephone may detect that the user has pressed the power button to turn off the display of the cellular telephone. The cellular telephone may skip steps 106 and 108 and wirelessly transmit information regarding the power down event to the head-mounted device at step 110. Alternatively, the cellular telephone may use the information from step 104 to determine that a focal point change is required on head-mounted device 10A and wirelessly transmit a focal point change instruction to the head-mounted device at step 110.

Consider a scenario in which a user operates a watch. At step 102, the watch may receive information from a paired head-mounted device regarding the position and/or orientation of that head-mounted device. At step 104, the watch may detect that the user has raised their arm to a typical viewing position for the watch. At step 106, position and/or orientation information of the watch may be used to determine the user attention (e.g., by comparing the orientation of the watch to the orientation of the head-mounted device, by comparing the orientation of the watch to known orientations, etc.). At step 108, the watch may use ultra-wideband communication to determine a distance between the watch and the head-mounted device. At step 110, the watch may wirelessly transmit information regarding the trigger event from step 104, the user attention information from step 106 and the distance from step 108 to the head-mounted device. Alternatively, the watch may use the information from steps 104-108 to determine that a focal point change is required on head-mounted device 10A and wirelessly transmit a focal point change instruction to the head-mounted device at step 110.

Consider another scenario in which a user operates a watch. At step 104, the watch may detect that the user has lowered their arm (indicating the user is likely no longer viewing the watch). The watch may skip steps 106 and 108 and wirelessly transmit information regarding the arm-lowering event to the head-mounted device at step 110. Alternatively, the watch may use the information from step 104 to determine that a focal point change is required on head-mounted device 10A and wirelessly transmit a focal point change instruction to the head-mounted device at step 110.

Consider a scenario in which a user operates a laptop computer. At step 102, the laptop computer may receive information from a paired head-mounted device regarding the position and/or orientation of that head-mounted device. At step 104, the laptop computer may detect that the user has pressed a key on the keyboard of the laptop computer. At step 106, the laptop computer may activate one or more sensors that determine user attention information for the electronic device. For example, the laptop computer may activate a facial recognition module that identifies a user's face and whether or not the user is paying attention to the laptop computer. Instead or in addition, position and/or orientation information of the laptop computer may be used to determine the user attention (e.g., by comparing the orientation of the laptop computer to the orientation of the head-mounted device, by comparing the orientation of the laptop computer to known orientations, etc.). At step 108, the laptop computer may use a LIDAR sensor to determine a distance between the laptop computer and the head-mounted device. At step 110, the laptop computer may wirelessly transmit information regarding the trigger at step 104, the user attention information from step 106, and the distance from step 108 to the head-mounted device. Alternatively, the laptop computer may use the information from steps 104-108 to determine that a focal point change is required on head-mounted device 10A and wirelessly transmit a focal point change instruction to the head-mounted device at step 110.

Consider another scenario in which a user operates a laptop computer. At step 104, the watch may detect that the user has closed or pressed a power button to power down the laptop computer (indicating the user is likely no longer viewing the laptop computer). The laptop computer may skip steps 106 and 108 and wirelessly transmit information regarding the power down event to the head-mounted device at step 110. Alternatively, the laptop computer may determine that a focal point change is required on head-mounted device 10A and wirelessly transmit a focal point change instruction to the head-mounted device at step 110.

Figure 5:
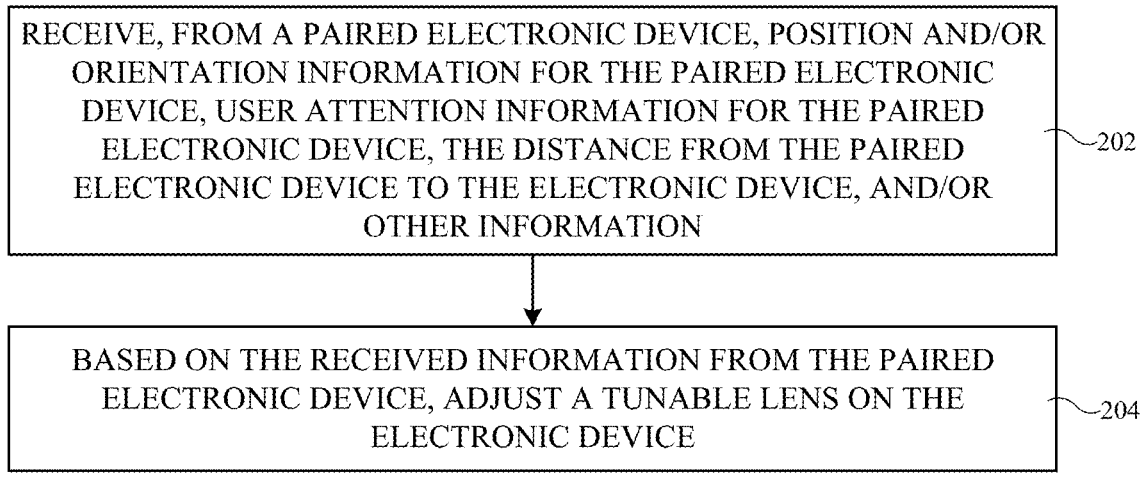
FIG. 5 is a flowchart of illustrative method steps for operating an illustrative electronic device that has an adjustable lens and that is paired with an electronic device in accordance with various embodiments.

FIG. 5 is a flowchart of illustrative method steps for operating an electronic device that has an adjustable lens and that is paired with an additional electronic device. For example, FIG. 5 shows method steps for operating head-mounted device 10A (which is paired with an electronic device 10B such as a cellular telephone, watch, laptop computer, etc.).

At step 202, head-mounted device 10A may receive various information from electronic device 10B. The information received at step 202 may include information regarding a trigger event at device 10B, position and/or orientation information for electronic device 10B, user attention information for the paired electronic device 10B, the distance from the paired electronic device 10B to head-mounted device 10A, a focal point change instruction, or any other desired information. At step 202, head-mounted device 10A may also transmit position and/or orientation information for head-mounted device 10A to electronic device 10B.

Next, at step 204, head-mounted device 10A may, based on the received information from the paired electronic device at step 202, adjust a tunable lens in head-mounted device 10A (such as tunable lens 72-1 in FIG. 3).

As an example, head-mounted device 10A may receive a focal point change instruction from electronic device 10B. In this scenario, head-mounted device 10A may adjust the adjustable lens in accordance with the received focal point change instruction. For example, the head-mounted device 10A may receive an instruction from electronic device 10B to adjust the optical power of the tunable lens to be +2 D.

As another example, head-mounted device 10A may receive user attention information (indicating that the user of head-mounted device 10A is likely paying attention to electronic device 10B) and a distance between head-mounted device 10A and electronic device 10B. In this scenario, head-mounted device 10A may adjust the adjustable lens to have an optimal optical power for the received distance. For example, the head-mounted device 10A may adjust the optical power of the tunable lens from 0 D to +2 D.

As another example, head-mounted device 10A may information that a distance between head-mounted device 10A and electronic device 10B has changed. In this scenario, head-mounted device 10A may adjust the adjustable lens to have an optimal optical power for the new distance. For example, the head-mounted device 10A may adjust the optical power of the tunable lens from +2 D to +1 D (e.g., lowering optical power) in response to the distance between devices 10A and 10B becoming greater.

As another example, head-mounted device 10A may receive user attention information indicating that the user of head-mounted device 10A is likely no longer paying attention to electronic device 10B. In this scenario, head-mounted device 10A may adjust the adjustable lens to have an optimal optical power for viewing distant objects. For example, the head-mounted device 10A may adjust the optical power of the tunable lens from +1 D to 0 D.

At step 204, the head-mounted device 10A may also present audio, visual, and/or haptic output to notify the user of the adjustment to the tunable lens.

Figure 6:
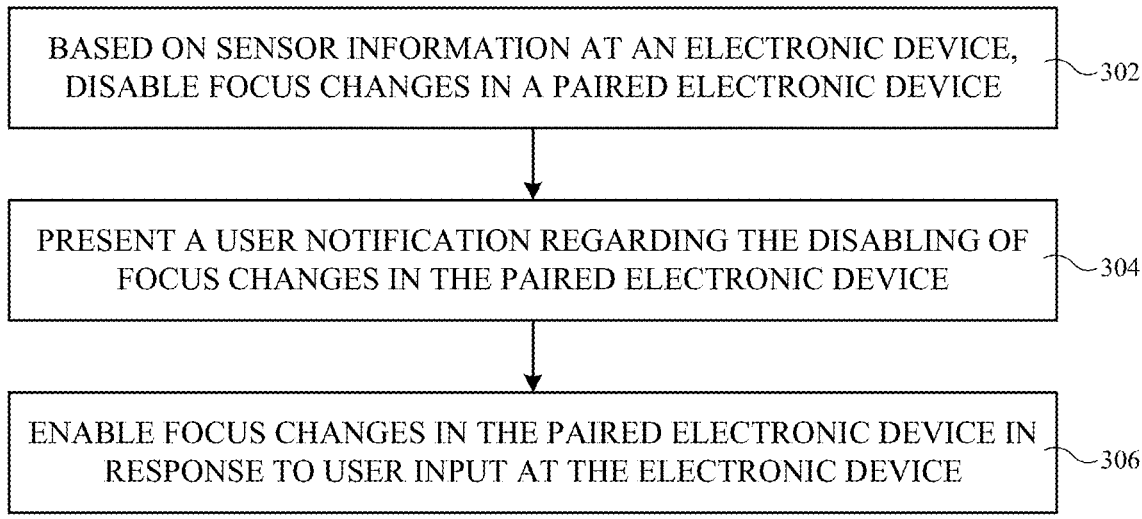
FIG. 6 is a flowchart of illustrative method steps for disabling adjustments to an electronic device with an adjustable lens in accordance with various embodiments.

FIG. 6 is a flowchart of illustrative method steps for operating an electronic device that is paired with a head-mounted device. At step 302, the electronic device may use information from one or more sensors to disable focal point changes (sometimes referred to as focus changes) in a paired head-mounted device. Disabling focal point changes may be preferred in certain scenarios when a user of the head-mounted device needs to maintain optimal distance vision. For example, focal point changes may be disabled when the user is driving a vehicle, riding a bike, etc.

The sensor information used to disable focal point changes may include accelerometer information, GPS location information, camera information, etc. For example, focal point changes may be disabled if the electronic device 10B is travelling at a speed above a given threshold, if the electronic device 10B is wirelessly linked to a vehicle, if the electronic device 10B is connected to a vehicle with a wired connection, etc. Electronic device 10B may transmit instructions to head-mounted device 10A to disable focus changes in the adjustable lens of head-mounted device 10A.

In another possible arrangement, one or more sensors in head-mounted device 10A may also be used to obtain information that is used to determine focal point changes should be disabled in the head-mounted device 10A. Head-mounted device 10A may disable focal point changes without influence from electronic device 10B if desired.

Regardless of whether device 10A or 10B is used to disable the focal point changes, electronic device 10B may present a user notification regarding the disabling of focus changes in head-mounted device 10A at step 304. For example, electronic device 10B may present a visual notification on display 14B in electronic device 10B, may play an audio notification using a speaker in electronic device 10B, etc. Head-mounted device 10A may also be used to present a notification regarding the disabling of focus changes. For example, head-mounted device 10A may present a visual notification on a display in head-mounted device 10A, play an audio notification using a speaker in head-mounted device 10A, etc.

At step 306, electronic device 10B may enable focus changes in the paired head-mounted device 10A in response to user input at electronic device 10B. In other words, the user may opt back in to focus changes if desired (overriding the initial disabling of focus changes). As an example, electronic device 10B may determine that the user is in a moving vehicle and therefore disables focal point changes in head-mounted device 10A to ensure safety while driving. However, the user of devices 10A and 10B may be a passenger instead of a driver and therefore may wish for the adjustable lens in device 10A to still automatically update focus based on user attention to device 10B. The user may provide user input to electronic devices 10A and/or 10B such as a voice command, touch input, and/or other desired user input that causes focal point changes in head-mounted device 10A to be enabled.

Figure 7A:
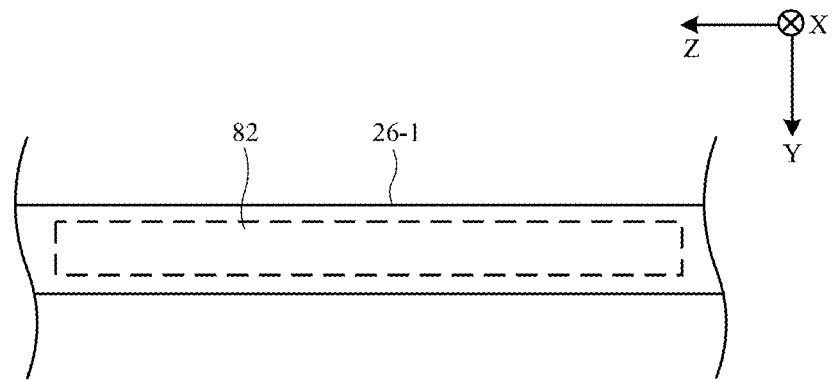
FIG. 7A is a side view of an illustrative head-mounted device with a touch sensor in accordance with various embodiments.

Instead or in addition to automatically updating the optical power of an adjustable lens based on user attention to a paired electronic device, head-mounted device 10A may include one or more manual controls for adjusting the adjustable lens. FIG. 7A is a side view of an illustrative touch sensor 82 that may be used to control the adjustable lens. Touch sensor 82 may be a capacitive touch sensor with touch sensor electrodes or any other desired type of touch sensor. The touch sensor may be formed in a support structure 26-1 for head-mounted device 10A such as an eyeglass temple, strap, or other desired support structure. This example is merely illustrative and the touch sensor may be formed in main unit 26-2 if desired.

The touch sensor may have an elongated shape with first and second opposing sides. In the example where the touch sensor is formed in an eyeglass temple, as in FIG. 7A, the first side may be adjacent to the front of head-mounted device 10A (e.g., on the side of the device with optical modules 70). When a user swipes a finger in a first direction (e.g., from the second side towards the first side in the positive Z-direction) the optical power may be either increased or decreased. When a user swipes a finger in a second direction that is opposite the first direction (e.g., from the first side towards the second side in the negative Z-direction) the optical power may be adjusted in the opposite manner as with the first direction. In other words, when the optical power of the adjustable lens is increased in response to a swipe in the first direction, the optical power of the adjustable lens is decreased in response to a swipe in the second direction. When the optical power of the adjustable lens is decreased in response to a swipe in the first direction, the optical power of the adjustable lens is increased in response to a swipe in the second direction.

Figure 7B:
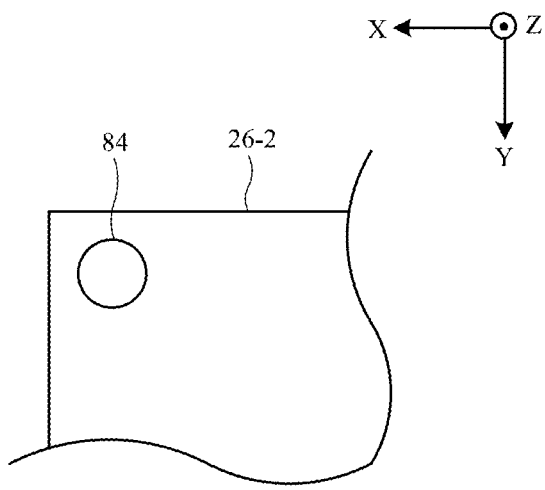
FIG. 7B is a front view of an illustrative head-mounted device with an input component in accordance with various embodiments.

FIG. 7B is a side view of an illustrative input component 84 that may be used to control the adjustable lens. Input component 84 (sometimes referred to as digital crown 84, button 84, rotatable input mechanism 84, etc.) may be pressed and/or rotated to provide input to head-mounted device 10A. The input component may be formed in a main unit 26-2 for head-mounted device 10A (e.g., on a front face of the main unit as in FIG. 7B or on another desired portion of the main unit). This example is merely illustrative and the input component may be formed in support structure 26-1 if desired.

As an example, when a user rotates input component 84 in a first direction (e.g., clockwise) the optical power may be either increased or decreased. When a user rotates input component 84 in a second direction that is opposite the first direction (e.g., counterclockwise) the optical power may be adjusted in the opposite manner as with the first direction. In other words, when the optical power of the adjustable lens is increased in response to a clockwise rotation, the optical power of the adjustable lens is decreased in response to a counterclockwise rotation. When the optical power of the adjustable lens is decreased in response to a clockwise rotation, the optical power of the adjustable lens is increased in response to a counterclockwise rotation.

The input mechanisms of FIGS. 7A and 7B may allow for a user to easily adjust the optical power of the adjustable lens. Instead or in addition, the user may provide inputs to electronic device 10B to adjust the adjustable lens on head-mounted device 10A. For example, the user may provide input to an application associated with the tunable lenses on electronic device 10B that causes the optical power of the adjustable lens to be updated.

If desired, a user for a head-mounted device 10A may enroll additional electronic devices 10B with associated viewing distances to optimize viewing of those additional electronic devices. Consider a user with a workstation that has a laptop computer with a first display at a first distance and a monitor with a second display at a second distance. The user may register the head orientation typically used to view the first and second displays and the optimal optical power for the adjustable lens for viewing the first and second displays. Thereafter, during real-time operation, the adjustable lens may automatically revert to the optimal optical power for the first display when the user views the first display and may automatically revert to the optimal optical power for the second display when the user views the second display.

In FIGS. 7A and 7B, examples are described where a user provides user input that manually adjusts the adjustable lens. In other words, the user may adjust the optical power of the adjustable lens up and down as desired. In another possible example, a user may provide user input (e.g., via a button press, voice command, etc.) that triggers one or more depth sensors to obtain a depth measurement. The depth sensor(s) may be a light detection and ranging (LIDAR) sensor that faces straight ahead relative to the user's head pose. This type of depth sensor may be referred to as a head-locked depth sensor. The depth sensor will therefore determine the distance to the object directly in front of (and therefore likely being viewed) by the user. The adjustable lens may automatically be adjusted based on the depth determined by the depth sensor. The effect for the user will therefore be the adjustable lens being adjusted to an optimal optical power for the object being faced in response to the user providing user input triggering the procedure. This type of procedure for adjusting the adjustable lens may have a low associated power consumption.

In the previous examples, electronic devices 10A and 10B may be capable of wireless communication and may be associated with the same user (e.g., signed into a cloud service using the same user ID). It may also be desirable for an adjustable lens in electronic device 10A to be automatically adjusted in response to focus on an object that is not paired with electronic device 10A. For example, the user of electronic device 10A may look at an electronic device (e.g., a cellular telephone or laptop computer) of another user (e.g., an electronic device that is not signed into a cloud service using the same user ID as device 10A), at an external monitor without wireless communications abilities, at a television, at an oscilloscope, at a camera screen, at a book, at a radio, at a computer keyboard, at a musical instrument, or at any other desired physical object or electronic equipment. For all of these objects, electronic device 10A is not exchanging wireless communications with the objects while the user views the objects. However, automatic adjustments to the adjustable lens in electronic device 10A may be enabled by attaching a beacon to the object of interest. Beacons of this type may have a unique identification that is broadcast during operation of the beacon. The beacon may enable the object to be easily detected by electronic device 10A.

The beacon may include a battery powered light emitter that encodes specific spectral content with a specific pattern that is detected by electronic device 10A (e.g., by a camera in electronic device 10A) and can be used to measure distance to the object. The light emitter may, for example, emit infrared light that is not visible to the user but is detected by an infrared camera in electronic device 10A. The frequency, pulse durations, and/or pattern of the emitted light may be unique to avoid false positives in identifying the beacon. When electronic device 10A detects the beacon in front of the user and/or within a threshold distance to the user, the adjustable lens may be adjusted into a mode for viewing close objects.

Instead or in addition, the beacon may include a battery powered ultra-wideband tag that may be detected and located by electronic device 10A. When electronic device 10A detects the beacon in front of the user and/or within a threshold distance to the user (e.g., using ultra-wideband communications), the adjustable lens may be adjusted into a mode for viewing close objects.

Instead or in addition, the beacon may include infrared retroreflector stickers that are attached to the object or a QR-code that is visible on the object. The infrared retroreflector stickers may have a specific spectral response and may be detected by electronic device 10A during operation of electronic device 10A. When electronic device 10A detects the beacon in front of the user and/or within a threshold distance to the user (e.g., using an infrared camera and/or visible light camera), the adjustable lens may be adjusted into a mode for viewing close objects.

Some electronic devices may display video with encoded information that is detected by electronic device 10A. For example, a laptop computer may modulate image content spatially and/or temporally in a manner that is detectable by electronic device 10A. When electronic device 10A detects the encoded information in front of the user and/or within a threshold distance to the user (e.g., using an infrared camera and/or visible light camera), the adjustable lens may be adjusted into a mode for viewing close objects.

When a given beacon is first detected by electronic device 10A, a user notification may be presented to the user (e.g., using a display, speaker, or other output device) regarding the presence of the beacon. If the user does not wish for the adjustable lens to be automatically updated when viewing the object, the user may decline to enroll the beacon for automatic adjustments. The user may instead choose to enroll the beacon for automatic adjustments to the adjustable lens. The user may accept or decline enrollment of the beacon using any desired input device on electronic device 10A (e.g., using touch input, a verbal command, an eye gesture, a face gesture, a head gesture, a button press, etc.). If the user accepts enrollment of the beacon for automatic adjustments to the adjustable lens, electronic device 10A may subsequently adjust the adjustable lens into a mode for viewing close objects in response to detecting the beacon in front of the user and/or within a threshold distance to the user.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
a head-mounted support structure;
an adjustable lens that is coupled to the head-mounted support structure; and
wireless communication circuitry configured to wirelessly receive information from a paired electronic device, wherein the adjustable lens is adjusted in response to the information received from the paired electronic device, wherein the information received from the paired electronic device comprises information regarding a gesture made with the paired electronic device, and wherein an optical power of the adjustable lens is increased in response to the information received from the paired electronic device indicating that the paired electronic device is being used.

2. The electronic device defined in claim 1, wherein the information received from the paired electronic device further comprises orientation information for the paired electronic device, the electronic device further comprising:
an accelerometer that is configured to obtain additional orientation information for the electronic device that is used along with the orientation information for the paired electronic device to adjust the adjustable lens.

3. The electronic device defined in claim 1, wherein the information received from the paired electronic device comprises user attention information and wherein the user attention information comprises information on whether a user is gazing at the paired electronic device.

4. The electronic device defined in claim 1, wherein the information received from the paired electronic device comprises information regarding a trigger event at the paired electronic device.

5. The electronic device defined in claim 4, wherein the information regarding the trigger event at the paired electronic device comprises information regarding a button press at the paired electronic device.

6. The electronic device defined in claim 4, wherein the information regarding the trigger event at the paired electronic device comprises information regarding an incoming notification at the paired electronic device.

7. The electronic device defined in claim 1, wherein the information received from the paired electronic device comprises a distance between the paired electronic device and the electronic device.

8. The electronic device defined in claim 7, wherein the distance between the paired electronic device and the electronic device is determined using ultra-wideband communications.

9. The electronic device defined in claim 7, wherein the distance between the paired electronic device and the electronic device is determined using a light detection and ranging (LIDAR) sensor.

10. The electronic device defined in claim 7, wherein the optical power of the adjustable lens is adjusted based on the distance between the paired electronic device and the electronic device.

11. The electronic device defined in claim 1, wherein the optical power of the adjustable lens is decreased in response to the information received from the paired electronic device indicating that the paired electronic device is no longer being used.

12. The electronic device defined in claim 1, wherein the wireless communication circuitry is configured to wirelessly receive the information from the paired electronic device using Bluetooth communications.

13. An electronic device, comprising:
a head-mounted support structure;
an adjustable lens that is coupled to the head-mounted support structure; and
wireless communication circuitry configured to wirelessly receive information from a paired electronic device, wherein the adjustable lens is adjusted in response to the information received from the paired electronic device and wherein the information received from the paired electronic device comprises information regarding a raise-to-wake gesture made with the paired electronic device.

14. An electronic device, comprising:
an accelerometer that is configured to obtain first orientation information; and
wireless communication circuitry configured to communicate with a head-mounted device having an adjustable lens, wherein the wireless communication circuitry is configured to:
receive second orientation information from the head-mounted device; and
after a trigger event and based at least on the first orientation information and the second orientation information, transmit information to the head-mounted device that causes an adjustment to the adjustable lens in the head-mounted device.

15. The electronic device of claim 14, wherein the adjustment to the adjustable lens comprises an adjustment to an optical power of the adjustable lens.

16. An electronic device, comprising:
a head-mounted support structure;
an adjustable lens that is coupled to the head-mounted support structure;
wireless communication circuitry configured to wirelessly receive user attention information from a paired electronic device; and
a manual control, wherein the adjustable lens is adjusted in response to the user attention information received from the paired electronic device and in response to the manual control.

17. The electronic device defined in claim 16, wherein the user attention information comprises information on whether a user is gazing at the paired electronic device.

18. An electronic device, comprising:
a head-mounted support structure;
an adjustable lens that is coupled to the head-mounted support structure; and
wireless communication circuitry configured to wirelessly receive information from a paired electronic device, wherein the adjustable lens is adjusted in response to the information received from the paired electronic device and wherein the information received from the paired electronic device comprises information regarding an incoming notification at the paired electronic device.

19. An electronic device, comprising:
a head-mounted support structure;
an adjustable lens that is coupled to the head-mounted support structure; and wireless communication circuitry configured to wirelessly receive information from a paired electronic device, wherein the adjustable lens is adjusted in response to first information from the paired electronic device and wherein the adjustment of the adjustable lens is disabled in response to second information from the paired electronic device.

\* \* \* \* \*